(12) United States Patent
Wang et al.

(10) Patent No.: US 11,920,999 B2
(45) Date of Patent: Mar. 5, 2024

(54) UNMANNED AERIAL VEHICLE CONTROL METHOD AND DEVICE, AND UNMANNED AERIAL VEHICLE

(71) Applicant: SZ DJI TECHNOLOGY CO., LTD., Shenzhen (CN)

(72) Inventors: Kai Wang, Shenzhen (CN); Xiang Gao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 247 days.

(21) Appl. No.: 17/605,509

(22) PCT Filed: Nov. 29, 2018

(86) PCT No.: PCT/CN2018/118099
§ 371 (c)(1),
(2) Date: Oct. 21, 2021

(87) PCT Pub. No.: WO2020/107310
PCT Pub. Date: Jun. 4, 2020

(65) Prior Publication Data
US 2022/0214241 A1 Jul. 7, 2022

(51) Int. Cl.
*G05D 1/10* (2006.01)
*B64C 39/02* (2023.01)
*G01M 1/12* (2006.01)
*G05D 1/00* (2006.01)
*B64U 101/60* (2023.01)

(52) U.S. Cl.
CPC ........... *G01M 1/127* (2013.01); *B64C 39/024* (2013.01); *G05D 1/0816* (2013.01); *G05D 1/106* (2019.05); *B64U 2101/60* (2023.01); *B64U 2201/20* (2023.01)

(58) Field of Classification Search
CPC ..... G01M 1/127; G05D 1/106; G05D 1/0816; B64C 39/024; B64U 2201/20; B64U 2101/60
See application file for complete search history.

(56) References Cited

U.S. PATENT DOCUMENTS 9,464,958 B2    10/2016  Shue
10,082,439 B1 *  9/2018  Helppi ................. G01M 1/127
(Continued)

FOREIGN PATENT DOCUMENTS

CN    103979106 A    8/2014
CN    205931245 U    2/2017
(Continued)

OTHER PUBLICATIONS

The World Intellectual Property Organization (WIPO) International Search Report and Written Opinion for PCT/CN2018/118099 dated Jul. 30, 2018 4 pages.
(Continued)

*Primary Examiner* — Hussein Elchanti
(74) *Attorney, Agent, or Firm* — ANOVA LAW GROUP, PLLC

(57) ABSTRACT

An unmanned aerial vehicle (UAV) control method includes obtaining target flight data and current flight data; determining a control state variable based on the target flight data and the current flight data; and calibrating a center of gravity of the UAV based on the control state variable.

19 Claims, 3 Drawing Sheets

(56) References Cited

U.S. PATENT DOCUMENTS

| | | | | |
|---|---|---|---|---|
| 10,124,893 | B1* | 11/2018 | Aalund | G08C 17/02 |
| 11,459,960 | B2* | 10/2022 | Darfeuil | B64D 31/02 |
| 2016/0209290 | A1 | 7/2016 | Shue | |
| 2016/0376004 | A1* | 12/2016 | Claridge | B64C 19/00 |
| | | | | 701/3 |
| 2018/0354623 | A1* | 12/2018 | Bhat | B64C 39/024 |
| 2019/0011932 | A1* | 1/2019 | Mcgrath | G05D 1/0875 |
| 2019/0235527 | A1* | 8/2019 | O'Brien | B64D 9/00 |
| 2020/0079487 | A1* | 3/2020 | Shim | B64B 1/58 |
| 2020/0223547 | A1* | 7/2020 | Mehta | G05D 1/0858 |
| 2020/0398983 | A1* | 12/2020 | Singh | B64C 29/0033 |
| 2022/0214241 | A1* | 7/2022 | Wang | B64C 17/00 |

FOREIGN PATENT DOCUMENTS

| | | | |
|---|---|---|---|
| CN | 107284653 A | 10/2017 | |
| CN | 107624171 A | 1/2018 | |
| CN | 206856983 U | 1/2018 | |
| CN | 108375988 A | 8/2018 | |
| CN | 108445913 A | 8/2018 | |
| WO | 2017214858 A1 | 12/2017 | |
| WO | 2018032425 A1 | 2/2018 | |
| WO | 2018200879 A1 | 11/2018 | |

OTHER PUBLICATIONS

Hai Sun, et al. Aerial Robotics (Quadcopter) Specialised Educational Materials, Mar. 2013, p. 43, Harbin.

* cited by examiner

UNMANNED AERIAL VEHICLE CONTROL METHOD AND DEVICE, AND UNMANNED AERIAL VEHICLE

CROSS-REFERENCE TO RELATED APPLICATION

This application is a national phase entry under 35 U.S.C. § 371 of International Application No. PCT/CN2018/118099, filed on Nov. 29, 2018, the entire content of which is incorporated herein by reference.

TECHNICAL FIELD

The present disclosure relates to the technical field of aircraft and, in particular, to an unmanned aerial vehicle (UAV) control method, a UAV control device, a UAV, a UAV system, and a computer storage medium.

BACKGROUND

Multi-rotor UAVs are widely used in the field of industrial and agriculture. In these fields, UAVs often use the equipment (e.g., payloads) mounted on them to perform different tasks. Therefore, the equipment mounted on UAVs presents a diversified trend. Some payloads are equipment that can be used by a particular type of UAV provided by the UAV manufacture, and some payloads are third-party equipment designed or purchased by the user. These payload changes will make the dynamic model of the UAV and the model that the UAV flight control system relied on during the design of the UAV to be quite different. Even though the robust design of the control system can ensure that the UAV can perform normal flight operations, when a payload differs greatly from the standard payload, the flight quality of the UAV will inevitably be reduced to varying degrees. For example, when the payload change causes the center of gravity of the entire UAV system to move more than a certain degree from a standard state, the UAV often has a "take-off nodding" problem when the UAV takes off and leaves the ground. This situation will also cause the UAV to move a short distance relative to the take-off point immediately after it leaves the ground, which may collide with surrounding objects, people, or even the pilot.

In response to be above problems, some UAV manufactures limit the installation position and weight of the payload by declaring the requirements for the payload to reduce the influence of the offset of the center of gravity, which will sacrifice a certain payload capacity. Some UAVs will require users to manually measure the position of the center of gravity and enter it into the UAV model system to solve this problem. Such operations are too complicated and impractical for most users, and it also affects the user experience. Some UAV manufactures will improve the controller's adaptability by improving the controller, but each time the UAV takes off and leaves the ground, it will still cause the take-off attitude to perform the "nodding" and the positional "horizontal drift" because the controller has not had time to estimate the model.

SUMMARY

The present disclosure aims to solve at least one of the technical problems existing in existing technology or related art.

Therefore, a first aspect of the present disclosure provides an unmanned aerial vehicle (UAV) control method.

A second aspect of the present disclosure provides a UAV control device.

A third aspect of the present disclosure provides a UAV.

A fourth aspect of the present disclosure provides a UAV system.

A fifth aspect of the present disclosure provides a computer storage medium.

In view of this, according to the first aspect of the present disclosure, a UAV control method is proposed. The UAV control method includes obtaining target flight data and current flight data; determining a control state variable based on the target flight data and the current flight data; and calibrating a center of gravity of the UAV based on the control state variable.

In the UAV control method proposed in the present disclosure, the target flight data and the current flight data of the UAV can be obtained. In the process of controlling the flight of the UAV, at least four control state variables, including at least a total pulling force instruction, a yaw axis torque instruction, a pitch axis torque instruction, and a roll axis torque instruction. The four control state variables mentioned above may correspond to the forces and torques received by the UAV due to the respective motors, that is, the total pulling force, yaw axis torque, pitch axis torque, and roll axis torque. Further, the offset between the center of gravity of the UAV and the pull center of the UAV can be obtained by calibrating the center of gravity of the UAV based on the control state variables. By adopting the technical solutions of the present disclosure, the offset between the current actual center of gravity position of the UAV and the standard position can be obtained, such that the degradation of the flight quality caused by the offset of the center of gravity position can be eliminated based on the offset. The technical solutions of the present disclosure are simple and convenient for users, have strong operability, and can greatly improve the payload adaptation capability of the UAV.

According to the second aspect of the present disclosure, a UAV control device is proposed. The UAV control device includes a processor configured to obtain target flight data and current flight data, determine a control state variable based on the target flight data and the current flight data, and perform a center of gravity calibration of the UAV based on the control state variable.

In the UAV control device proposed in the present disclosure, the processor can be configured to obtain the target flight data and the current flight data of the UAV. In the process of controlling the flight of the UAV, at least four control state variables, including at least a total pulling force instruction, a yaw axis torque instruction, a pitch axis torque instruction, and a roll axis torque instruction. The four control state variables mentioned above may correspond to the forces and torques received by the UAV due to the respective motors, that is, the total pulling force, yaw axis torque, pitch axis torque, and roll axis torque. Further, the processor can be configured to obtain the offset between the center of gravity of the UAV and the center of pull of the UAV by calibrating the center of gravity of the UAV based on the control state variables. Consistent with the present disclosure, the offset between the current actual center of gravity position of the UAV and the standard position can be obtained through the UAV control device, such that the degradation of the flight quality caused by the offset of the center of gravity position can be eliminated based on the offset. The technical solutions of the present disclosure are simple and convenient for users, have strong operability, and can greatly improve the payload adaptation capability of the UAV.

According to the third aspect of the present disclosure, a UAV is proposed. The UAV includes a power device and a controller configured to obtain target flight data and current flight data, determine a control state variable based on the target flight data and the current flight data, and perform a center of gravity calibration of the UAV based on the control state variable.

In the UAV proposed in the present disclosure, the controller can be configured to obtain the target flight data and the current flight data of the UAV. In the process of controlling the flight of the UAV, at least four control state variables, including at least a total pulling force instruction, a yaw axis torque instruction, a pitch axis torque instruction, and a roll axis torque instruction. The four control state variables mentioned above may correspond to the forces and torques received by the UAV due to the respective motors, that is, the total pulling force, yaw axis torque, pitch axis torque, and roll axis torque. Further, the processor can be configured to obtain the offset between the center of gravity of the UAV and the center of pull of the UAV by calibrating the center of gravity of the UAV based on the control state variables. Consistent with the present disclosure, the offset between the current actual center of gravity position of the UAV and the standard position can be obtained through the UAV, such that the degradation of the flight quality caused by the offset of the center of gravity position can be eliminated based on the offset. The technical solutions of the present disclosure are simple and convenient for users, have strong operability, and can greatly improve the payload adaptation capability of the UAV.

According to the fourth aspect of the present disclosure, a UAV system is proposed. The UAV system includes a control terminal configured to send a center of gravity calibration instruction to a UAV, the UAV being configured to calibrate the center of gravity based on the center of gravity calibration instruction to obtain a calibration result.

The UAV system proposed in the present disclosure includes a control terminal and a UAV. When using the UAV to carry a payload, the user can send the center of gravity calibration instruction to the UAV through the control terminal. The UAV receives the center of gravity calibration instruction, realizes the center of gravity calibration, and obtains the calibration result. The calibration result includes calibration success, calibration failure, or calibration data, etc. Consistent with the present disclosure, the offset between the current actual center of gravity position of the UAV and the standard position can be obtained, such that the degradation of the flight quality caused by the offset of the center of gravity position can be eliminated based on the offset. The technical solutions of the present disclosure are simple and convenient for users, have strong operability, and can greatly improve the payload adaptation capability of the UAV.

According to the fifth aspect of the present disclosure, a computer storage medium is proposed. The computer storage medium is configured to store a plurality of program instructions, and the program instructions are used to obtain target flight data and current flight data, determine a control state variable based on the target flight data and the current flight data, and perform a center of gravity calibration of the UAV based on the control state variable.

The computer storage medium proposed in the present disclosure is configured to store program instructions, and the program instruction are used to obtain the target flight data and the current flight data. In the process of controlling the flight of the UAV, at least four control state variables, including at least a total pulling force instruction, a yaw axis torque instruction, a pitch axis torque instruction, and a roll axis torque instruction. The four control state variables mentioned above may correspond to the forces and torques received by the UAV due to the respective motors, that is, the total pulling force, yaw axis torque, pitch axis torque, and roll axis torque. Further, the offset between the center of gravity of the UAV and the pull center of the UAV can be obtained by calibrating the center of gravity of the UAV based on the control state variables. Consistent with the present disclosure, the offset between the current actual center of gravity position of the UAV and the standard position can be obtained, such that the degradation of the flight quality caused by the offset of the center of gravity position can be eliminated based on the offset. The technical solutions of the present disclosure are simple and convenient for users, have strong operability, and can greatly improve the payload adaptation capability of the UAV.

The additional aspects and advantages of the present disclosure will become apparent in the following description, or be learned through the practice of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION OF THE EMBODIMENTS

In order to make the objectives, technical solutions, and advantages of the present disclosure more clear, the technical solutions in the embodiments of the present disclosure will be described below with reference to the drawings. It should be noted that in the case where there is no conflict between the exemplary embodiments, the features of the following embodiments and examples may be combined with each other.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Figure 1:
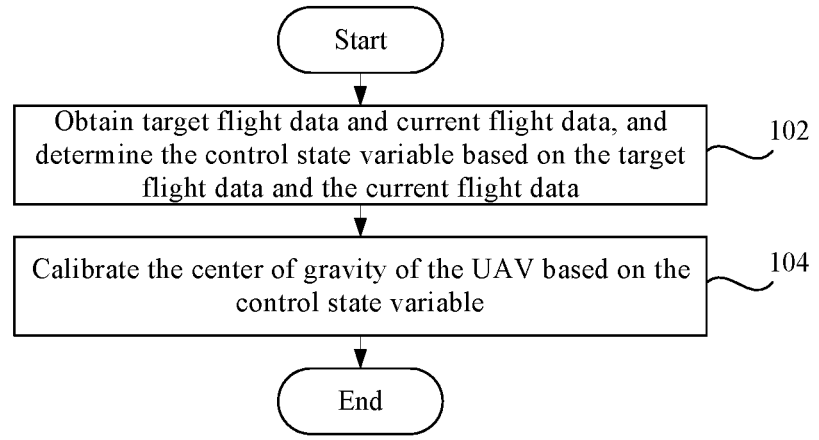
FIG. 1 is a flowchart of a UAV control method according to an embodiment of the present disclosure.

An embodiment of the present disclosure provides a UAV control method. FIG. 1 is a flowchart of a UAV control method according to an embodiment of the present disclosure. The method will be described in detail below.

Step 102, obtaining target flight data and current flight data, and determining a control state variable based on the target flight data and the current flight data.

In some embodiments, the control state variable (also referred to as "control state parameter" or "control state measure") may include four or more control state variables, for example, including at least a total pulling force instruction, a yaw axis torque instruction, a pitch axis torque instruction, and a roll axis torque instruction. More specifically, the target flight data and the current flight data of the UAV can be obtained. During the flight control of the UAV, four of more control state variables can be provided based on the target flight data and the current flight data, namely the total pulling force instruction, yaw axis torque instruction, pitch axis torque instruction, and roll axis torque instruction. Further, the UAV may include a power device, and the power device may be one or more motors. The four control state variables mentioned above may correspond to the forces and torques received by the UAV due to the respective motors, that is, the total pulling force, yaw axis torque, pitch axis torque, and roll axis torque.

Step 104, calibrating the center of gravity of the UAV based on the control state variable.

In some embodiments, the center of gravity of the UAV can be calibrated based on the control state variable obtained in the process at step 102. Further, an offset between the center of gravity of the UAV and the center of pull of the UAV can be determined based on the control state variable.

In some embodiments, calibrating the center of gravity of the UAV based on the control state variable may include calculating the offset data between the center of gravity of the UAV and the center of pull of the UAV based on the control state variable.

In some embodiments, the offset data may include one or a combination of an offset position, an offset mass, an offset force, and an offset torque.

In some embodiments, the offset data between the control state variable of the UAV and the center of pull of the UAV can be calculated based on the control state variable, that is, the offset between the actual position of the center of gravity of the UAV and the standard position. The offset data may be the offset position, offset mass, offset force, offset torque, etc.

In some embodiments, the flight controller of the UAV may continuously provide four or more control state variables during the flight of the UAV. The four or more control state variables may at least include, e.g., the total pulling force instruction $T_c$, the yaw axis torque instruction $\tau_{zc}$, the pitch axis torque instruction $\tau_{yc}$, and the roll axis torque instruction $\tau_{xc}$. These four control state variables may correspond to the forces and torques that the UAV will eventually receive due to the speed of each motor, that is, the total pulling force T, the yaw axis torque $\tau_z$, the pitch axis torque $\tau_y$, and the roll axis torque $\tau_x$.

Figure 2:
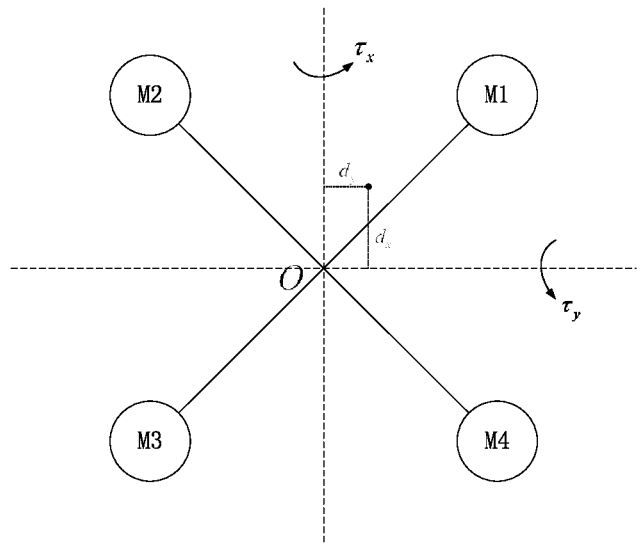
FIG. 2 is a schematic diagram of a UAV's center of gravity offset according to an embodiment of the present disclosure.

The center of a circumscribed circle of a regular polygon surrounded by all the motor positions can be defined as an equivalent pull center. As shown in FIG. 2, take a quad-rotor UAV as an example, the quad-rotor UAV includes four motors, and a point O is the equivalent pull center of the quad-rotor UAV. Based on the force translation theorem, the pulling force of all motors can be equivalent to the total pulling force T on the center of the equivalent pulling force plus two torques $\tau_x$ and $\tau_y$ around the horizontal axis.

Figure 3:
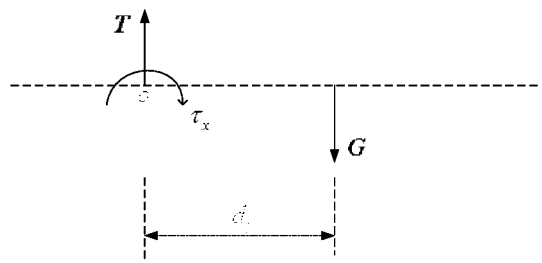
FIG. 3 is a force analysis diagram of a single channel when the center of gravity is offset according to an embodiment of the present disclosure.

When the center of gravity of the UAV is completely coincident with the center of gravity of the pulling force, based on the two-force balance rule, the pulling force may only need to equal to the gravity, that is T=G, to maintain the balance of the UAV. At this time, the torque on the two horizontal rotation axes of the UAV may be close to zero. However, if the center of gravity of the UAV does not coincide with the equivalent pulling center, the user may also need to manually adjust the UAV torque to maintain balance. Take the non-coincidence in the roll direction as an example, the force analysis diagram can be as shown in FIG. 3. Based on the law of force balance of rigid bodies, when the UAV maintains a stable hovering state, then $$T=G \qquad (1)$$

$$T \times d_y + \tau_x = 0 \qquad (2)$$

When the UAV has reached a stable state, then $$T=T_c \qquad (3)$$

$$\tau_x = \tau_{xc} \qquad (4)$$

Therefore, $d_y = -\tau_{xc}/T_c$ and $d_x = -\tau_{yc}/T_c$. In this way, when the UAV remains hovering, the flight control system of the UAV can use the above formulas to calculate the horizontal position of the UAV's center of gravity relative to the center of the propeller plane under current mounting, that is, the offset distance.

Of course, the offset data is not limited to the offset distance. In other embodiments, the offset data may include one or a combination of the offset position, the offset mass, the offset force, and the offset torque. For example, for some UAVs whose modeling is not accurate enough, the estimated center of gravity offset may not be the true offset distance, but a controlled compensation value from the vertical channel to each rotation channel, such as the offset mass, the offset force, the offset torque, etc. This embodiment is merely an example, and should not be construed as a limitation in the embodiments of the present disclosure.

In some embodiments, the method may further include storing the offset data.

In some embodiments, after calibrating the offset data, the offset data may be stored to a non-volatile memory such as Flash, EEPROM, etc. Under to condition of carrying the same payload, the UAV may load the offset data every time after powering on. The UAV may provide early compensation control based on the offset data every time it takes off, such that the equivalent pulling center may also act on the actual center of gravity. In this way, the early compensation can eliminate the "take-off nodding" situation described above. In some embodiments, the method may further include generating a control component based on the offset data, and controlling the power device of the UAV based on the control component.

In some embodiments, the control component can be generated based on the offset data, and the power device of the UAV can be controlled based on the control component to reduce the offset data, thereby making the UAV fly stably, and improving the flight quality. The flight control system may distribute the control amount of each control channel more accurately and reduce the coupling amount between the channels. For example, at each take-off, the UAV's control system may accurately distribute the pulling force of each power device through the early compensation control based on the stored offset data, such that the equivalent pulling force center may also act on the actual center of gravity. In this way, the early compensation can eliminate the "take-off nodding" situation described above. Alternatively, during the flight of the UAV, the pulling force of each power device may be accurately distributed, such that the equivalent pulling force center may also act on the actual center of gravity, thereby ensuring flight quality.

In some embodiments, the method may further include comparing the offset data with a preset threshold, and determining whether the UAV's payload installation position exceeds a specified installation range based on the comparison result.

In some embodiments, determining whether the UAV's payload installation position exceeds a specified installation range based on the comparison result may include determining that the UAV's payload installation position exceeds the specified installation range when the comparison result indicates that the offset data is greater than or equal to the preset threshold; and determining that the UAV's payload installation position does not exceed the specified installation range when the comparison result indicates that the offset data is less than the preset threshold. It can be understood that in other embodiments, whether the payload installation position of the UAV exceeds the specified installation range based on the comparison result may also be determined based on other suitable preset rules. For example, the UAV's payload installation position may be determined as exceeding specified installation range when the comparison result indicates that the offset data is greater than the preset threshold; and the UAV's payload installation position may be determined as not exceeding specified installation range when the comparison result indicates that the offset data is less than or equal to the preset threshold, which is not limited in the embodiments of the present disclosure.

In some embodiments, after calculating the offset data, the offset data may be compared with the preset threshold (i.e., the offset range) supported by the UAV to inform the use whether the payload installation position exceeds the preset threshold. In this way, the UAV may self-detect whether it supports the payload installation or whether the payload installation position is reasonable.

In some embodiments, the method may further include recording the control state variable in a preset period of time, and performing the center of gravity calibration of the UAV based on the control state variable in the preset period of time.

In some embodiments, the output of each control state variable may be recorded to eliminate the offset of the center of gravity over a period of time. After counting the control state variable within a period of time, the random error of the control state variable can be eliminated by taking the average value and other methods to eliminate the interference caused by wind or aircraft vibration. Subsequently, the offset data can be calculated to improve the accuracy of the offset data.

In some embodiments, before calibrating the center of gravity of the UAV based on the control state variable, the method may further include obtaining state data of the UAV and determining whether the state data meets a condition of calibrating the center of gravity; and calibrating the center of gravity of the UAV based on the control state variable when the state data meets the condition of calibrating the center of gravity.

In some embodiments, the state data may include one or a combination of positioning data, image data, attitude data, acceleration data, and angular velocity data.

In some embodiments, the condition of calibrating the center of gravity may include the UAV being in a balanced state.

In some embodiments, the condition of calibrating the center of gravity may further include the inertial measurement unit (IMU) of the UAV being calibrated with data.

In some embodiments, before calibrating the center of gravity of the UAV, it may be needed to determine whether the state data meets the condition for allowing the center of gravity calibration. For example, the condition of calibrating the center of gravity may be whether the UAV is in a balanced state, and the center of gravity calibration may be accurate when the UAV is in the balanced state. In some embodiments, the balanced state may include the hovering mode and the mode where the horizontal position is stationary during the course of heading rotation in the positioning mode. The condition of calibrating the center of gravity may also be that the IMU of the UAV has calibrated the data. When the UAV is in a balanced state and the data obtained by the IMU is accurate data, the accuracy of the center of gravity calibration can be improved.

In some embodiments, the method may further include obtaining surrounding environment data of the UAV and determining whether the surrounding environment data meets the condition of calibrating the center of gravity; and calibrating the center of gravity of the UAV based on the control state variable when the surrounding environment data meets the condition of calibrating the center of gravity.

In some embodiments, the surrounding environment data may include an ambient airflow or an ambient wind speed.

In some embodiments, the condition of calibrating the center of gravity may include the wind speed of the environment in which the UAV is positioned being less than a preset wind speed.

In some embodiments, the surrounding environment data can be obtained based on the attitude of the UAV, or based on other external sensors, such as anemometers of information obtained from cloud weather stations. When the surrounding environment is a windless environment, no external force will be brought to the UAV to interfere with the airflow. In this way, the interference in the calibration of the center of gravity of the UAV can be avoided.

In some embodiments, the condition of calibrating the center of gravity may include the following conditions.

(1) The UAV has positioning and hovering capabilities. In the above calculations, it is assumed that the UAV is already in the balanced state, that is, the above derivation process may only be established when the UAV is at a stationary state. Since it is very difficult to rely on users to maintain the balance an UAV with multiple wings, the UAV may need to have the ability to position and hover without manual operation. Further, whether the UAV is in the balanced state may be determined through positioning data, image data, attitude data, etc. For example, the positioning information of the UAV can be obtained through positioning devices (such as GPS, real-time kinematic (RTK) technology, etc.). When the obtained position of the UAV has not changed, the UAV can be considered to be in a hovering state. Alternatively, a plurality of images of the surrounding environment of the UAV can be obtained through a visual sensor within a certain period of time, and image processing can be performed on the obtained plurality of images. When the position of the object in the obtained images has not change, the UAV can be considered to be in a hovering state. Further, the acceleration and speed information of the UAV can also be obtained through the IMU. When the acceleration and speed of the UAV are zero, the UAV can be considered to be in a hovering state. In other embodiments, the determination can also be made by data fusion of one or more of the above determination methods to improve the determination accuracy.

(2) The surrounding airflow is stable and there is no wind. When the surrounding environment is windy, the UAV may also be affected by external forces caused by the interference of the airflow. As such, even if the UAV is in a hovering state, due to the introduction of new external forces that are difficult to estimate and cannot be ignored, the above derivation process will be invalid. Therefore, the environment required for calibration may need to be a calm airflow environment with no wind. Whether the UAV is in a windless environment can be determined based on the inclination angle data of the UAV, etc. In some embodiments, the inclination angle data of the UAV can be obtained by a wind collecting device.

(3) The IMU of the UAV is calibrated correctly. The IMU needs to have been calibrated to eliminate the steady-state error caused by temperature, otherwise the error will be considered by the above algorithm to be caused by the center of gravity offset. UAVs can have the IMU calibration function, and it is recommended to recalibrate the IMU before each calibration of the center of gravity.

In some embodiments, the distance of the UAV from the ground may be greater than a preset distance. In this case, the UAV can be ensured to be at a preset distance from the ground, for example, at a height of more than two meters from the ground, thereby reducing the influence of turbulence caused by the ground.

In some embodiments, when the condition of calibrating the center of gravity is not met, the calibration can be stopped, and a first instruction can be sent to the control terminal. In this case, the first instruction may include the reason for not meeting the condition of calibrating the center of gravity and adjustment suggestion information.

In some embodiments, when the calibration fails, the calibration can be stopped and a second instruction can be sent to the control terminal. In this case, the second instruction may include the reason for the calibration failure.

Consistent with the present disclosure, the offset between the current actual center of gravity position of the UAV and the standard position can be obtained, such that the degradation of the flight quality caused by the offset of the center of gravity position can be eliminated based on the offset. The technical solutions of the present disclosure is simple and convenient for users, has strong operability, and can greatly improve the payload adaptation capability of the UAV. Users can adapt their own payloads to the UAV frame without worrying about the deterioration of the flight quality, which significantly improves the ability of the AUV to support third-party payloads.

Figure 4:
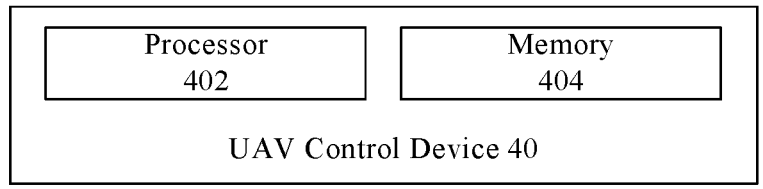
FIG. 4 is a schematic diagram of a UAV control device according to an embodiment of the present disclosure.

An embodiment of the present disclosure provides a UAV control device. FIG. 4 is a schematic diagram of a UAV control device 40 according to an embodiment of the present disclosure. The UAV control device 40 includes a processor 402 configured to obtain target flight data and current flight data, determine the control state variable based on the target flight data and the current flight data, and perform center of gravity calibration of the UAV based on the control state variable.

In some embodiments, the control state variable may include four or more control state variables, for example, including at least a total pulling force instruction, a yaw axis torque instruction, a pitch axis torque instruction, and a roll axis torque instruction. More specifically, the target flight data and the current flight data of the UAV can be obtained. During the flight control of the UAV, four of more control state variables can be provided based on the target flight data and the current flight data, namely the total pulling force instruction, yaw axis torque instruction, pitch axis torque instruction, and roll axis torque instruction. Further, the UAV may include a power device, and the power device may be one or more motors. The four control state variables mentioned above may correspond to the forces and torques received by the UAV due to the respective motors, that is, the total pulling force, yaw axis torque, pitch axis torque, and roll axis torque. The center of gravity of the UAV can be calibrated based on the control state variable. Further, the offset between the center of gravity of the UAV and the center of pull of the UAV can be obtained based on the control state variable.

In some embodiments, the processor 402 may include one or more microprocessors.

In some embodiments, the processor 402 calibrating the center of gravity of the UAV based on the control state variable may include calculating the offset data between the center of gravity of the UAV and the center of pull of the UAV based on the control state variable.

In some embodiments, the offset data may include one or a combination of an offset position, an offset mass, an offset force, and an offset torque.

In some embodiments, the offset data between the control state variable of the UAV and the center of pull of the UAV can be calculated based on the control state variable, that is, the offset between the actual position of the center of gravity of the UAV and the standard position. The offset data may be the offset position, offset mass, offset force, offset torque, etc.

In some embodiments, the flight controller of the UAV may continuously provide four or more control state variables during the flight of the UAV. The four or more control state variables may at least include, e.g., the total pulling force instruction $T_c$, the yaw axis torque instruction $\tau_{zc}$, the pitch axis torque instruction $\tau_{yc}$, and the roll axis torque instruction $\tau_{xc}$. These four control state variables may correspond to the forces and torques that the UAV will eventually receive due to the speed of each motor, that is, the total pulling force T, the yaw axis torque $\tau_z$, the pitch axis torque $\tau_y$, and the roll axis torque $\tau_x$.

The center of a circumscribed circle of a regular polygon surrounded by all the motor positions can be defined as an equivalent pull center. As shown in FIG. 2, take a quad-rotor UAV as an example, the quad-rotor UAV includes four motors, and a point O is the equivalent pull center of the quad-rotor UAV. Based on the force translation theorem, the pulling force of all motors can be equivalent to the total pulling force T on the center of the equivalent pulling force plus two torques $\tau_x$ and $\tau_y$ around the horizontal axis.

When the center of gravity of the UAV is completely coincident with the center of gravity of the pulling force, based on the two-force balance rule, the pulling force may only need to equal to the gravity, that is T=G, to maintain the balance of the UAV. At this time, the torque on the two horizontal rotation axes of the UAV may be close to zero. However, if the center of gravity of the UAV does not coincide with the equivalent pulling center, the user may also need to manually adjust the AUV torque to maintain balance. Take the non-coincidence in the roll direction as an example, the force analysis diagram can be as shown in FIG.

3. Based on the law of force balance of rigid bodies, when the AUV maintains a stable hovering state, then $$T=G \quad (1)$$

$$T \times d_y + \tau_x = 0 \quad (2)$$

When the UAV has reached a stable state, then $$T=T_c \quad (3)$$

$$\tau_x = \tau_{xc} \quad (4)$$

Therefore, $d_y = -\tau_{xc}/T_c$, and $d_x = -\tau_{yc}/T_c$. In this way, when the UAV remains hovering, the flight control system of the UAV can use the above formulas to calculate the horizontal position of the UAV's center of gravity relative to the center of the propeller plane under current mounting, that is, the offset distance.

Of course, the offset data is not limited to the offset distance. In other embodiments, the offset data may include one or a combination of the offset position, the offset mass, the offset force, and the offset torque. For example, for some UAVs whose modeling is not accurate enough, the estimated center of gravity offset may not be the true offset distance, but a controlled compensation value from the vertical channel to each rotation channel, such as the offset mass, the offset force, the offset torque, etc. This embodiment is merely an example, and should not be construed as a limitation in the embodiments of the present disclosure.

As shown in FIG. 4, the UAV control device 40 further includes a memory 404 configured to store offset data.

In some embodiments, after calibrating the offset data, the offset data may be stored to a non-volatile memory such as Flash, EEPROM, etc. Under to condition of carrying the same payload, the UAV may load the offset data every time after powering on. The UAV may provide early compensation control based on the offset data every time it takes off, such that the equivalent pulling center may also act on the actual center of gravity. In this way, the early compensation can eliminate the "take-off nodding" situation described above.

In some embodiments, the memory 404 may be a serial memory or a parallel memory. The memory 404 may be a random-access memory (RAM) or a read-only memory (ROM).

In some embodiments, the processor 402 may be further configured to generate a control component based on the offset data, and control the power device of the UAV based on the control component.

In some embodiments, the control component can be generated based on the offset data, and the power device of the UAV can be controlled based on the control component to reduce the offset data, thereby making the UAV fly stably, and improving the flight quality. The flight control system may distribute the control amount of each control channel more accurately and reduce the coupling amount between the channels. For example, at each take-off, the UAV's control system may accurately distribute the pulling force of each power device through the early compensation control based on the stored offset data, such that the equivalent pulling force center may also act on the actual center of gravity. In this way, the early compensation can eliminate the "take-off nodding" situation described above. Alternatively, during the flight of the UAV, the pulling force of each power device may be accurately distributed, such that the equivalent pulling force center may also act on the actual center of gravity, thereby ensuring flight quality.

In some embodiments, the processor 402 may be further configured to compare the offset data with a preset threshold, and determine whether the payload installation position of the UAV exceeds the specified installation range based on the comparison result.

In some embodiments, the processor 402 determining whether the payload installation position of the UAV exceeds the specified installation range based on the comparison result may include determining that the UAV's payload installation position exceeds the specified installation range when the comparison result indicates that the offset data is greater than or equal to the preset threshold; and determining that the UAV's payload installation position does not exceed the specified installation range when the comparison result indicates that the offset data is less than the preset threshold. It can be understood that in other embodiments, whether the payload installation position of the UAV exceeds the specified installation range based on the comparison result may also be determined based on other suitable preset rules. For example, the UAV's payload installation position may be determined as exceeding specified installation range when the comparison result indicates that the offset data is greater than the preset threshold; and the UAV's payload installation position may be determined as not exceeding specified installation range when the comparison result indicates that the offset data is less than or equal to the preset threshold, which is not limited in the embodiments of the present disclosure.

In some embodiments, after calculating the offset data, the offset data may be compared with the preset threshold (i.e., the offset range) supported by the UAV to inform the use whether the payload installation position exceeds the preset threshold. In this way, the UAV may self-detect whether it supports the payload installation or whether the payload installation position is reasonable.

In some embodiments, the processor 402 may be further configured to record the control state variable in a preset period of time, and perform the center of gravity calibration of the UAV based on the control state variable in the preset period of time.

In some embodiments, the output of each control state variable may be recorded to eliminate the offset of the center of gravity over a period of time. After counting the control state variable within a period of time, the random error of the control state variable can be eliminated by taking the average value and other methods to eliminate the interference caused by wind or aircraft vibration. Subsequently, the offset data can be calculated to improve the accuracy of the offset data.

In some embodiments, the processor 402 may be further configured to obtain the state data of the UAV, and determine whether the state data meets the condition of calibrating the center of gravity. When the state data meets the condition of calibrating the center of gravity, the UAV's center of gravity calibration can be performed based on the control state variable.

In some embodiments, the state data may include one or a combination of positioning data, image data, attitude data, acceleration data, and angular velocity data.

In some embodiments, the condition of calibrating the center of gravity may include the UAV being in a balanced state.

In some embodiments, the condition of calibrating the center of gravity may further include the inertial measurement unit (IMU) of the UAV being calibrated with data.

In some embodiments, before calibrating the center of gravity of the UAV, it may be needed to determine whether the state data meets the condition for allowing the center of gravity calibration. For example, the condition of calibrating the center of gravity may be whether the UAV is in a balanced state, and the center of gravity calibration may be accurate when the UAV is in the balanced state. In some embodiments, the balanced state may include the hovering mode and the mode where the horizontal position is stationary during the course of heading rotation in the positioning mode. The condition of calibrating the center of gravity may also be that the IMU of the UAV has calibrated the data. When the UAV is in a balanced state and the data obtained by the IMU is accurate data, the accuracy of the center of gravity calibration can be improved.

In some embodiments, the processor 402 may be further configured to obtain the surrounding environment data of the UAV, and determine whether the surrounding environment data meets the condition of calibrating the center of gravity. When the surrounding environment data meets the condition of calibrating the center of gravity, the center of gravity of the UAV can be calibrated based on the control state variable.

In some embodiments, the surrounding environment data may include the ambient airflow or the ambient wind speed.

In some embodiments, the condition of calibrating the center of gravity may include the wind speed of the environment in which the UAV is positioned being less than a preset wind speed.

In some embodiments, the surrounding environment data can be obtained based on the attitude of the UAV, or based on other external sensors, such as anemometers of information obtained from cloud weather stations. When the surrounding environment is a windless environment, no external force will be brought to the UAV to interfere with the airflow. In this way, the interference in the calibration of the center of gravity of the UAV can be avoided.

In some embodiments, the condition of calibrating the center of gravity may include the following conditions.

(1) The UAV has positioning and hovering capabilities. In the above calculations, it is assumed that the UAV is already in the balanced state, that is, the above derivation process may only be established when the UAV is at a stationary state. Since it is very difficult to rely on users to maintain the balance an UAV with multiple wings, the UAV may need to have the ability to position and hover without manual operation. Further, whether the UAV is in the balanced state may be determined through positioning data, image data, attitude data, etc. For example, the positioning information of the UAV can be obtained through positioning devices (such as GPS, real-time kinematic (RTK) technology, etc.). When the obtained position of the UAV has not changed, the UAV can be considered to be in a hovering state. Alternatively, a plurality of images of the surrounding environment of the UAV can be obtained through a visual sensor within a certain period of time, and image processing can be performed on the obtained plurality of images. When the position of the object in the obtained images has not change, the UAV can be considered to be in a hovering state. Further, the acceleration and speed information of the UAV can also be obtained through the IMU. When the acceleration and speed of the UAV are zero, the UAV can be considered to be in a hovering state. In other embodiments, the determination can also be made by data fusion of one or more of the above determination methods to improve the determination accuracy.

(2) The surrounding airflow is stable and there is no wind. When the surrounding environment is windy, the UAV may also be affected by external forces caused by the interference of the airflow. As such, even if the UAV is in a hovering state, due to the introduction of new external forces that are difficult to estimate and cannot be ignored, the above derivation process will be invalid. Therefore, the environment required for calibration may need to be a calm airflow environment with no wind. Whether the UAV is in a windless environment can be determined based on the inclination angle data of the UAV, etc. In some embodiments, the inclination angle data of the UAV can be obtained by a wind collecting device.

(3) The IMU of the UAV is calibrated correctly. The IMU needs to have been calibrated to eliminate the steady-state error caused by temperature, otherwise the error will be considered by the above algorithm to be caused by the center of gravity offset. UAVs can have the IMU calibration function, and it is recommended to recalibrate the IMU before each calibration of the center of gravity.

In some embodiments, the distance of the UAV from the ground may be greater than a preset distance. In this case, the UAV can be ensured to be at a preset distance from the ground, for example, at a height of more than two meters from the ground, thereby reducing the influence of turbulence caused by the ground.

In some embodiments, the processor 402 may be further configured to stop the calibration when the condition of calibrating the center of gravity is not met, and send a first instruction to the control terminal. In this case, the first instruction may include the reason for not meeting the condition of calibrating the center of gravity and adjustment suggestion information.

In some embodiments, the processor 402 may be further configured to stop the calibration when the calibration fails, and send a second instruction to the control terminal. In this case, the second instruction may include the reason for the calibration failure.

Consistent with the present disclosure, the offset between the current actual center of gravity position of the UAV and the standard position can be obtained, such that the degradation of the flight quality caused by the offset of the center of gravity position can be eliminated based on the offset. The technical solutions of the present disclosure is simple and convenient for users, has strong operability, and can greatly improve the payload adaptation capability of the UAV. Users can adapt their own payloads to the UAV frame without worrying about the deterioration of the flight quality, which significantly improves the ability of the AUV to support third-party payloads.

Figure 5:
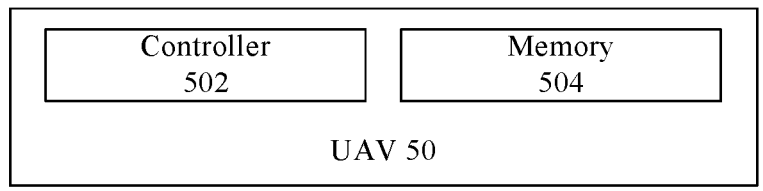
FIG. 5 is a schematic diagram of a UAV according to an embodiment of the present disclosure.

An embodiment of the present disclosure provides a UAV. FIG. 5 is a schematic diagram of a UAV 50 according to an embodiment of the present disclosure. The UAV 50 includes a controller 502 configured to obtain the target flight data and the current flight data, determine the control state variable based on the target flight data and the current flight data, and calibrate the center of gravity of the UAV based on the control state variable.

In some embodiments, the control state variable may include four or more control state variables, for example, including at least a total pulling force instruction, a yaw axis torque instruction, a pitch axis torque instruction, and a roll axis torque instruction. More specifically, the controller 502 may obtain the target flight data and the current flight data of the UAV 50. During the flight control of the UAV 50, four of more control state variables can be provided based on the target flight data and the current flight data, namely the total pulling force instruction, yaw axis torque instruction, pitch axis torque instruction, and roll axis torque instruction. Further, the UAV may include a power device, and the power device may be one or more motors. The four control state variables mentioned above may correspond to the forces and torques received by the UAV 50 due to the respective motors, that is, the total pulling force, yaw axis torque, pitch axis torque, and roll axis torque. The center of gravity of the UAV 50 can be calibrated based on the control state variable. Further, the offset between the center of gravity of the UAV 50 and the center of pull of the UAV 50 can be obtained based on the control state variable.

In some embodiments, the controller 502 may include one or more microprocessors.

In some embodiments, the controller 502 calibrating the center of gravity of the UAV based on the control state variable may include calculating the offset data between the center of gravity of the UAV and the center of pull of the UAV based on the control state variable.

In some embodiments, the offset data may include one or a combination of an offset position, an offset mass, an offset force, and an offset torque.

In some embodiments, the offset data between the control state variable of the UAV and the center of pull of the UAV can be calculated based on the control state variable, that is, the offset between the actual position of the center of gravity of the UAV and the standard position. The offset data may be the offset position, offset mass, offset force, offset torque, etc.

Figure 6:
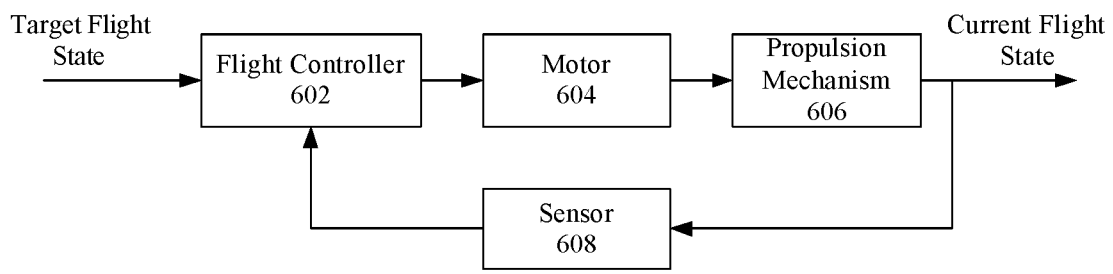
FIG. 6 is a schematic diagram of a flight control system of a UAV according to an embodiment of the present disclosure.

In some embodiments, the flight control system of the UAV may be as shown in FIG. 6. As shown in FIG. 6, the flight control system includes a flight controller 602, a motor 604, a propulsion mechanism 606 (such as propellers), and a sensor 608. The stability and control of the UAV can be achieved through the flight control system. More specifically, the speed instruction or position instruction of the remote control or host computer can be input to the flight controller 602 as the target flight state, and the sensor 608 can obtain the current flight state and send it to the flight controller 602. The flight controller 602 can perform calculation and analysis based on the current flight state and the target flight state, generate and send instructions to the motor 604, and the motor 604 can drive the propulsion mechanism 606 to adjust the attitude of the UAV. In some embodiments, the sensor 608 may be a sensor of the UAV components such as the propulsion mechanism 606 and the motor 604, or the sensor 608 may also be set in other suitable positions of the UAV to obtain the current flight state of the UAV.

In some embodiments, the flight controller of the UAV may continuously provide four or more control state variables during the flight of the UAV. The four or more control state variables may include, for example, at least the total pulling force instruction $T_c$, the yaw axis torque instruction $\tau_{xc}$, the pitch axis torque instruction $\tau_{yc}$, and the roll axis torque instruction $\tau_{xc}$. These four control state variables may correspond to the forces and torques that the UAV will eventually receive due to the speed of each motor, that is, the total pulling force T, the yaw axis torque $\tau_z$, the pitch axis torque $\tau_y$, and the roll axis torque $\tau_x$.

The center of a circumscribed circle of a regular polygon surrounded by all the motor positions can be defined as an equivalent pull center. As shown in FIG. 2, take a quad-rotor UAV as an example, the quad-rotor UAV includes four motors, and a point O is the equivalent pull center of the quad-rotor UAV. Based on the force translation theorem, the pulling force of all motors can be equivalent to the total pulling force T on the center of the equivalent pulling force plus two torques $\tau_x$ and $\tau_y$ around the horizontal axis.

When the center of gravity of the UAV is completely coincident with the center of gravity of the pulling force, based on the two-force balance rule, the pulling force may only need to equal to the gravity, that is T=G, to maintain the balance of the UAV. At this time, the torque on the two horizontal rotation axes of the UAV may be close to zero. However, if the center of gravity of the UAV does not coincide with the equivalent pulling center, the user may also need to manually adjust the AUV torque to maintain balance. Take the non-coincidence in the roll direction as an example, the force analysis diagram can be as shown in FIG. 3. Based on the law of force balance of rigid bodies, when the AUV maintains a stable hovering state, then $$T=G \tag{1}$$

$$T \times d_y + \tau_x = 0 \tag{2}$$

When the UAV has reached a stable state, then $$T=T_c \tag{3}$$

$$\tau_x = \tau_{xc} \tag{4}$$

Therefore, $d_y = -\tau_{xc}/T_c$, and $d_x = -\tau_{yc}/T_c$. In this way, when the UAV remains hovering, the flight control system of the UAV can use the above formulas to calculate the horizontal position of the UAV's center of gravity relative to the center of the propeller plane under current mounting, that is, the offset distance.

Of course, the offset data is not limited to the offset distance. In other embodiments, the offset data may include one or a combination of the offset position, the offset mass, the offset force, and the offset torque. For example, for some UAVs whose modeling is not accurate enough, the estimated center of gravity offset may not be the true offset distance, but a controlled compensation value from the vertical channel to each rotation channel, such as the offset mass, the offset force, the offset torque, etc. This embodiment is merely an example, and should not be construed as a limitation in the embodiments of the present disclosure.

As shown in FIG. 5, the UAV 50 further includes a memory 504 configured to store offset data.

In some embodiments, after calibrating the offset data, the offset data may be stored to a non-volatile memory such as Flash, EEPROM, etc. Under to condition of carrying the same payload, the UAV may load the offset data every time after powering on. The UAV may provide early compensation control based on the offset data every time it takes off, such that the equivalent pulling center may also act on the actual center of gravity. In this way, the early compensation can eliminate the "take-off nodding" situation described above.

In some embodiments, the memory 504 may be a serial memory or a parallel memory. The memory 504 may be a random-access memory (RAM) or a read-only memory (ROM).

In some embodiments, the controller 502 may be further configured to generate a control component based on the offset data, and control the power device of the UAV based on the control component.

In some embodiments, the control component can be generated based on the offset data, and the power device of the UAV can be controlled based on the control component to reduce the offset data, thereby making the UAV fly stably, and improving the flight quality. The flight control system may distribute the control amount of each control channel more accurately and reduce the coupling amount between the channels. For example, at each take-off, the controller 502 of the UAV 50 can accurately distribute the pulling force of each power device through the early compensation control based on the stored offset data, such that the equivalent pulling force center may also act on the actual center of gravity. In this way, the early compensation can eliminate the "take-off nodding" situation described above. Alternatively, during the flight of the UAV 50, the pulling force of each power device may be accurately distributed, such that the equivalent pulling force center may also act on the actual center of gravity, thereby ensuring flight quality.

In some embodiments, the controller 502 may be further configured to compare the offset data with a preset threshold, and determine whether the payload installation position of the UAV exceeds the specified installation range based on the comparison result.

In some embodiments, the controller 502 determining whether the payload installation position of the UAV exceeds the specified installation range based on the comparison result may include determining that the UAV's payload installation position exceeds the specified installation range when the comparison result indicates that the offset data is greater than or equal to the preset threshold; and determining that the UAV's payload installation position does not exceed the specified installation range when the comparison result indicates that the offset data is less than the preset threshold. It can be understood that in other embodiments, whether the payload installation position of the UAV exceeds the specified installation range based on the comparison result may also be determined based on other suitable preset rules. For example, the UAV's payload installation position may be determined as exceeding specified installation range when the comparison result indicates that the offset data is greater than the preset threshold; and the UAV's payload installation position may be determined as not exceeding specified installation range when the comparison result indicates that the offset data is less than or equal to the preset threshold, which is not limited in the embodiments of the present disclosure.

In some embodiments, after calculating the offset data, the offset data may be compared with the preset threshold (i.e., the offset range) supported by the UAV to inform the use whether the payload installation position exceeds the preset threshold. In this way, the UAV may self-detect whether it supports the payload installation or whether the payload installation position is reasonable.

In some embodiments, the controller 502 may be further configured to record the control state variable in a preset period of time, and perform the center of gravity calibration of the UAV based on the control state variable in the preset period of time.

In some embodiments, the output of each control state variable may be recorded to eliminate the offset of the center of gravity over a period of time. After counting the control state variable within a period of time, the random error of the control state variable can be eliminated by taking the average value and other methods to eliminate the interference caused by wind or aircraft vibration. Subsequently, the offset data can be calculated to improve the accuracy of the offset data.

In some embodiments, the controller 502 may be further configured to obtain the state data of the UAV, and determine whether the state data meets the condition of calibrating the center of gravity. When the state data meets the condition of calibrating the center of gravity, the UAV's center of gravity calibration can be performed based on the control state variable.

In some embodiments, the state data may include one or a combination of positioning data, image data, attitude data, acceleration data, and angular velocity data.

In some embodiments, the condition of calibrating the center of gravity may include the UAV being in a balanced state, the wind speed of the environment where the UAV is position being less than a preset wind speed, or the IMU of the UAV has been calibrated.

In some embodiments, the condition of calibrating the center of gravity may further include the inertial measurement unit (IMU) of the UAV being calibrated with data.

In some embodiments, before calibrating the center of gravity of the UAV, it may be needed to determine whether the state data meets the condition for allowing the center of gravity calibration. For example, the condition of calibrating the center of gravity may be whether the UAV is in a balanced state, and the center of gravity calibration may be accurate when the UAV is in the balanced state. In some embodiments, the balanced state may include the hovering mode and the mode where the horizontal position is stationary during the course of heading rotation in the positioning mode. The condition of calibrating the center of gravity may also be that the IMU of the UAV has calibrated the data. When the UAV is in a balanced state and the data obtained by the IMU is accurate data, the accuracy of the center of gravity calibration can be improved.

In some embodiments, the controller 502 may be further configured to obtain the surrounding environment data of the UAV, and determine whether the surrounding environment data meets the condition of calibrating the center of gravity. When the surrounding environment data meets the condition of calibrating the center of gravity, the center of gravity of the UAV can be calibrated based on the control state variable.

In some embodiments, the surrounding environment data may include the ambient airflow or the ambient wind speed.

In some embodiments, the condition of calibrating the center of gravity may include the wind speed of the environment in which the UAV is positioned being less than a preset wind speed.

In some embodiments, the surrounding environment data can be obtained based on the attitude of the UAV, or based on other external sensors, such as anemometers of information obtained from cloud weather stations. When the surrounding environment is a windless environment, no external force will be brought to the UAV to interfere with the airflow. In this way, the interference in the calibration of the center of gravity of the UAV can be avoided.

In some embodiments, the condition of calibrating the center of gravity may include the following conditions.

(1) The UAV has positioning and hovering capabilities. In the above calculations, it is assumed that the UAV is already in the balanced state, that is, the above derivation process may only be established when the UAV is at a stationary state. Since it is very difficult to rely on users to maintain the balance an UAV with multiple wings, the UAV may need to have the ability to position and hover without manual operation. Further, whether the UAV is in the balanced state may be determined through positioning data, image data, attitude data, etc. For example, the positioning information of the UAV can be obtained through positioning devices (such as GPS, real-time kinematic (RTK) technology, etc.). When the obtained position of the UAV has not changed, the UAV can be considered to be in a hovering state. Alternatively, a plurality of images of the surrounding environment of the UAV can be obtained through a visual sensor within a certain period of time, and image processing can be performed on the obtained plurality of images. When the position of the object in the obtained images has not change, the UAV can be considered to be in a hovering state. Further, the acceleration and speed information of the UAV can also be obtained through the IMU. When the acceleration and speed of the UAV are zero, the UAV can be considered to be in a hovering state. In other embodiments, the determination can also be made by data fusion of one or more of the above determination methods to improve the determination accuracy.

(2) The surrounding airflow is stable and there is no wind. When the surrounding environment is windy, the UAV may also be affected by external forces caused by the interference of the airflow. As such, even if the UAV is in a hovering state, due to the introduction of new external forces that are difficult to estimate and cannot be ignored, the above derivation process will be invalid. Therefore, the environment required for calibration may need to be a calm airflow environment with no wind. Whether the UAV is in a windless environment can be determined based on the inclination angle data of the UAV, etc. In some embodiments, the inclination angle data of the UAV can be obtained by a wind collecting device.

(3) The IMU of the UAV is calibrated correctly. The IMU needs to have been calibrated to eliminate the steady-state error caused by temperature, otherwise the error will be considered by the above algorithm to be caused by the center of gravity offset. UAVs can have the IMU calibration function, and it is recommended to recalibrate the IMU before each calibration of the center of gravity.

In some embodiments, the distance of the UAV from the ground may be greater than a preset distance. In this case, the UAV can be ensured to be at a preset distance from the ground, for example, at a height of more than two meters from the ground, thereby reducing the influence of turbulence caused by the ground.

In some embodiments, the controller 502 may be further configured to stop the calibration when the condition of calibrating the center of gravity is not met, and send a first instruction to the control terminal. In this case, the first instruction may include the reason for not meeting the condition of calibrating the center of gravity and adjustment suggestion information.

In some embodiments, the controller 502 may be further configured to stop the calibration when the calibration fails, and send a second instruction to the control terminal. In this case, the second instruction may include the reason for the calibration failure.

Consistent with the present disclosure, the offset between the current actual center of gravity position of the UAV and the standard position can be obtained, such that the degradation of the flight quality caused by the offset of the center of gravity position can be eliminated based on the offset. The technical solutions of the present disclosure is simple and convenient for users, has strong operability, and can greatly improve the payload adaptation capability of the UAV. Users can adapt their own payloads to the UAV frame without worrying about the deterioration of the flight quality, which significantly improves the ability of the AUV to support third-party payloads.

Figure 7:
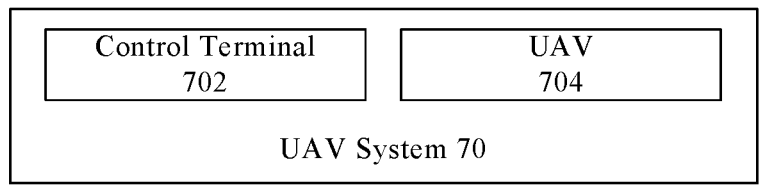
FIG. 7 is a schematic diagram of a UAV system according to an embodiment of the present disclosure.

An embodiment of the present disclosure further provides a UAV system. FIG. 7 is a schematic diagram of a UAV system 70 according to an embodiment of the present disclosure. As shown in FIG. 7, the UAV system 70 includes a control terminal 702 configured to send a center of gravity calibration instruction to the UAV, and a UAV 704 configured to calibrate the center of gravity based on the center of gravity calibration instruction to obtain a calibration result.

In some embodiments, when the user needs to use the UAV 704 to carry payloads, the user can send the center of gravity calibration instruction to the UAV 704 through the control terminal 702. The UAV 704 can be configured to receive the center of gravity calibration instruction, realize the center of gravity calibration, and obtain the calibration result. The calibration result may include calibration success, calibration failure, or calibration data, etc.

In some embodiments, the UAV 704 may be further configured to send the calibration result to the control terminal 702.

In some embodiments, the control terminal 702 may further include a display device configured to display the calibration result. In this case, the calibration result can be displayed on the display device of the control terminal 702 to ensure that the user can intuitively obtain the calibration result.

In some embodiments, the UAV 704 performing the center of gravity calibration based on the center of gravity calibration instruction may include obtaining the target flight data and the current flight data based on the center of gravity calibration instruction, determining the control state variable based on the target flight data and the current flight data, and performing the center of gravity calibration of the UAV 704 based on the control state variable.

In some embodiments, the control state variable may include four or more control state variables including a total pulling force instruction, a yaw axis torque instruction, a pitch axis torque instruction, and a roll axis torque instruction. More specifically, the target flight data and the current flight data of the UAV 704 can be obtained. During the flight control of the UAV 704, four of more control state variables can be provided based on the target flight data and the current flight data, namely the total pulling force instruction, yaw axis torque instruction, pitch axis torque instruction, and roll axis torque instruction. Further, the UAV 704 may include a power device, and the power device may be one or more motors. The four control state variables mentioned above may correspond to the forces and torques received by the UAV 704 due to the respective motors, that is, the total pulling force, yaw axis torque, pitch axis torque, and roll axis torque. The center of gravity of the UAV 704 can be calibrated based on the control state variable. Further, the offset between the center of gravity of the UAV 704 and the center of pull of the UAV can be obtained based on the control state variable, and the degradation of flight quality caused by the offset of the center of gravity position can be eliminated based on the offset.

In some embodiments, the UAV 704 calibrating the center of gravity of the UAV based on the control state variable may include calculating the offset data between the center of gravity of the UAV and the center of pull of the UAV based on the control state variable.

In some embodiments, the offset data may include one or a combination of an offset position, an offset mass, an offset force, and an offset torque.

In some embodiments, the offset data between the control state variable of the UAV and the center of pull of the UAV can be calculated based on the control state variable, that is, the offset between the actual position of the center of gravity of the UAV and the standard position. The offset data may be the offset position, offset mass, offset force, offset torque, etc.

In some embodiments, the flight controller of the UAV may continuously provide four or more control state variables during the flight of the UAV. The four or more control state variables may include, for example, at least the total pulling force instruction $T_c$, the yaw axis torque instruction $\tau_{zc}$, the pitch axis torque instruction $\tau_{yc}$, and the roll axis torque instruction $\tau_{xc}$. These four control state variables may correspond to the forces and torques that the UAV will eventually receive due to the speed of each motor, that is, the total pulling force T, the yaw axis torque $\tau_z$, the pitch axis torque $\tau_y$, and the roll axis torque $\tau_x$.

The center of a circumscribed circle of a regular polygon surrounded by all the motor positions can be defined as an equivalent pull center. As shown in FIG. 2, take a quad-rotor UAV as an example, the quad-rotor UAV includes four motors, and a point O is the equivalent pull center of the quad-rotor UAV. Based on the force translation theorem, the pulling force of all motors can be equivalent to the total pulling force T on the center of the equivalent pulling force plus two torques $\tau_x$ and $\tau_y$ around the horizontal axis.

When the center of gravity of the UAV is completely coincident with the center of gravity of the pulling force, based on the two-force balance rule, the pulling force may only need to equal to the gravity, that is T=G, to maintain the balance of the UAV. At this time, the torque on the two horizontal rotation axes of the UAV may be close to zero. However, if the center of gravity of the UAV does not coincide with the equivalent pulling center, the user may also need to manually adjust the AUV torque to maintain balance. Take the non-coincidence in the roll direction as an example, the force analysis diagram can be as shown in FIG. 3. Based on the law of force balance of rigid bodies, when the AUV maintains a stable hovering state, then $$T=G \quad (1)$$

$$T \times d_y + \tau_x = 0 \quad (2)$$

When the UAV has reached a stable state, then $$T=T_c \quad (3)$$

$$\tau_x = \tau_{xc} \quad (4)$$

Therefore, $d_y = -\tau_{xc}/T_c$, and $d_x = -\tau_{yc}/T_c$. In this way, when the UAV remains hovering, the flight control system of the UAV can use the above formulas to calculate the horizontal position of the UAV's center of gravity relative to the center of the propeller plane under current mounting, that is, the offset distance.

Of course, the offset data is not limited to the offset distance. In other embodiments, the offset data may include one or a combination of the offset position, the offset mass, the offset force, and the offset torque. For example, for some UAVs whose modeling is not accurate enough, the estimated center of gravity offset may not be the true offset distance, but a controlled compensation value from the vertical channel to each rotation channel, such as the offset mass, the offset force, the offset torque, etc. This embodiment is merely an example, and should not be construed as a limitation in the embodiments of the present disclosure.

In some embodiments, the UAV 704 can be used to store the offset data.

In some embodiments, after calculating the offset data of the center of gravity of the UAV 704 and the pulling force center of the UAV 704, the offset data can be stored in a non-volatile memory such as Flash, EEPROM, etc. Under to condition of carrying the same payload, the UAV 704 may load the offset data every time after powering on. The UAV may provide early compensation control based on the offset data every time it takes off, such that the equivalent pulling center may also act on the actual center of gravity. In this way, the early compensation can eliminate the "take-off nodding" situation described above.

In some embodiments, the control terminal 702 may be further configured to store the offset data and send the offset data to the UAV. In this case, the offset data may also be stored on the control terminal 702, and the control terminal 702 may directly send the offset data to the UAV 704 when sending the center of gravity calibration instruction.

In some embodiments, the UAV 704 may be further configured to generate a control component based on the offset data, and control the power device of the UAV 704 based on the control component.

In some embodiments, the control component can be generated based on the offset data, and the power device of the UAV can be controlled based on the control component to reduce the offset data, thereby making the UAV fly stably, and improving the flight quality. The UAV 704 may distribute the control amount of each control channel more accurately and reduce the coupling amount between the channels. For example, at each take-off, the control system of the UAV 704 can accurately distribute the pulling force of each power device through the early compensation control based on the stored offset data, such that the equivalent pulling force center may also act on the actual center of gravity. In this way, the early compensation can eliminate the "take-off nodding" situation described above. Alternatively, during the flight of the UAV 704, the pulling force of each power device may be accurately distributed, such that the equivalent pulling force center may also act on the actual center of gravity, thereby ensuring flight quality.

In some embodiments, the UAV 704 may be further configured to compare the offset data with a preset threshold, and determine whether the payload installation position of the UAV exceeds the specified installation range based on the comparison result.

In some embodiments, the UAV 704 determining whether the payload installation position of the UAV exceeds the specified installation range based on the comparison result may include determining that the payload installation position of the UAV 704 exceeds the specified installation range when the comparison result indicates that the offset data is greater than or equal to the preset threshold; and determining that the payload installation position of the UAV 704 does not exceed the specified installation range when the comparison result indicates that the offset data is less than the preset threshold. It can be understood that in other embodiments, whether the payload installation position of the UAV exceeds the specified installation range based on the comparison result may also be determined based on other suitable preset rules. For example, the UAV's payload installation position may be determined as exceeding specified installation range when the comparison result indicates that the offset data is greater than the preset threshold; and the UAV's payload installation position may be determined as not exceeding specified installation range when the comparison result indicates that the offset data is less than or equal to the preset threshold, which is not limited in the embodiments of the present disclosure.

In some embodiments, after calculating the offset data, the offset data may be compared with the preset threshold (i.e., the offset range) supported by the UAV 704 to inform the use whether the payload installation position exceeds the preset threshold. In this way, the UAV 704 may self-detect whether it supports the payload installation or whether the payload installation position is reasonable.

In some embodiments, the UAV 704 may be further configured to send the result of whether the payload installation position exceeds the specified installation range to the control terminal 702. The display device may also be used to display the result of whether the payload installation position exceeds the specified installation range. In this case, the control terminal 702 can display the result of whether the payload installation position exceeds the specified installation range to remind the user to adjust the payload installation position.

In some embodiments, the UAV 704 may be further configured to record the control state variable in a preset period of time, and perform the center of gravity calibration of the UAV 704 based on the control state variable in the preset period of time.

In some embodiments, the output of each control state variable may be recorded to eliminate the offset of the center of gravity over a period of time. After counting the control state variable within a period of time, the random error of the control state variable can be eliminated by taking the average value and other methods to eliminate the interference caused by wind or aircraft vibration. Subsequently, the offset data can be calculated to improve the accuracy of the offset data.

In some embodiments, a prompt device of the UAV 704 may be configured to send out a calibration prompt message during the center of gravity calibration based on the center of gravity calibration instruction. In this case, in order to inform the user of the calibration progress in real time, the calibration state can be reported to the user by flashing a special color of the UAV state light, making a set sound, etc.

In some embodiments, the UAV 704 may be further configured to obtain the state data and determine whether the state data meets the condition of calibrating the center of gravity. When the state data meets the condition of calibrating the center of gravity, the center of gravity calibration can be performed based on the center of gravity calibration instruction.

In some embodiments, the UAV 704 may be further configured to send calibration progress information to the control terminal 702. For example, the calibration state can be reported to the user by displaying a progress bar on an application of the control terminal 702.

In some embodiments, the state data may include one or a combination of positioning data, image data, attitude data, acceleration data, and angular velocity data.

In some embodiments, the condition of calibrating the center of gravity may include the UAV being in a balanced state.

In some embodiments, the condition of calibrating the center of gravity may further include the inertial measurement unit (IMU) of the UAV being calibrated with data.

In some embodiments, before calibrating the center of gravity of the UAV, it may be needed to determine whether the state data meets the condition for allowing the center of gravity calibration. For example, the condition of calibrating the center of gravity may be whether the UAV is in a balanced state, and the center of gravity calibration may be accurate when the UAV is in the balanced state. In some embodiments, the balanced state may include the hovering mode and the mode where the horizontal position is stationary during the course of heading rotation in the positioning mode. The condition of calibrating the center of gravity may also be that the IMU of the UAV has calibrated the data. When the UAV is in a balanced state and the data obtained by the IMU is accurate data, the accuracy of the center of gravity calibration can be improved.

In some embodiments, the UAV 704 may be further configured to obtain the surrounding environment data of the UAV and determine whether the surrounding environment data meets the condition of calibrating the center of gravity. When the surrounding environment data meets the condition of calibrating the center of gravity, the calibration of the center of gravity of the UAV can be performed based on the control state variable.

In some embodiments, the surrounding environment data may include the ambient airflow or the ambient wind speed.

In some embodiments, the condition of calibrating the center of gravity may include the wind speed of the environment in which the UAV is positioned being less than a preset wind speed.

In some embodiments, the surrounding environment data can be obtained based on the attitude of the UAV, or based on other external sensors, such as anemometers of information obtained from cloud weather stations. When the surrounding environment is a windless environment, no external force will be brought to the UAV to interfere with the airflow. In this way, the interference in the calibration of the center of gravity of the UAV can be avoided.

In some embodiments, the condition of calibrating the center of gravity may include the following conditions.

(1) The UAV has positioning and hovering capabilities. In the above calculations, it is assumed that the UAV is already in the balanced state, that is, the above derivation process may only be established when the UAV is at a stationary state. Since it is very difficult to rely on users to maintain the balance an UAV with multiple wings, the UAV may need to have the ability to position and hover without manual operation. Further, whether the UAV is in the balanced state may be determined through positioning data, image data, attitude data, etc. For example, the positioning information of the UAV can be obtained through positioning devices (such as GPS, real-time kinematic (RTK) technology, etc.). When the obtained position of the UAV has not changed, the UAV can be considered to be in a hovering state. Alternatively, a plurality of images of the surrounding environment of the UAV can be obtained through a visual sensor within a certain period of time, and image processing can be performed on the obtained plurality of images. When the position of the object in the obtained images has not change, the UAV can be considered to be in a hovering state. Further, the acceleration and speed information of the UAV can also be obtained through the IMU. When the acceleration and speed of the UAV are zero, the UAV can be considered to be in a hovering state. In other embodiments, the determination can also be made by data fusion of one or more of the above determination methods to improve the determination accuracy.

(2) The surrounding airflow is stable and there is no wind. When the surrounding environment is windy, the UAV may also be affected by external forces caused by the interference of the airflow. As such, even if the UAV is in a hovering state, due to the introduction of new external forces that are difficult to estimate and cannot be ignored, the above derivation process will be invalid. Therefore, the environment required for calibration may need to be a calm airflow environment with no wind. Whether the UAV is in a windless environment can be determined based on the inclination angle data of the UAV, etc. In some embodiments, the inclination angle data of the UAV can be obtained by a wind collecting device.

(3) The IMU of the UAV is calibrated correctly. The IMU needs to have been calibrated to eliminate the steady-state error caused by temperature, otherwise the error will be considered by the above algorithm to be caused by the center of gravity offset. UAVs can have the IMU calibration function, and it is recommended to recalibrate the IMU before each calibration of the center of gravity.

In some embodiments, the distance of the UAV 704 from the ground may be greater than a preset distance. In this case, the UAV can be ensured to be at a preset distance from the ground, for example, at a height of more than two meters from the ground, thereby reducing the influence of turbulence caused by the ground.

In some embodiments, the UAV 704 may be further configured to stop the calibration when the state data does not meet the condition of calibrating the center of gravity, and send a first instruction to the control terminal 702. Information that the state data does not meet the condition of calibrating the center of gravity (e.g., the UAV is not in a balanced state) and adjustment suggestion information (e.g., adjusting the hovering state of the UAV) can be displayed through the display device of the control terminal 702.

In some embodiments, the first instruction may include the reason for not meeting the condition of calibrating the center of gravity and the adjustment suggestion information.

In some embodiments, the UAV 704 may be further configured to stop the calibration when the calibration fails, and send a second instruction to the control terminal 702.

In some embodiments, the second instruction may include the reason for the calibration failure.

In some embodiments, during the process of the UAV 704 performing the center of gravity calibration based on the center of gravity calibration instruction, if the state data does not meet the condition of calibrating the center of gravity, the calibration can be stopped and the first instruction can be sent to the control terminal 702. In this case, if the user performs an operation during the calibration process or the data convergence is poor due to limited sensor accuracy, the calibration operation may be interrupted in advance, and the calibration failure and the reason for the failure can be reported to the user through the application of the control terminal 702.

Consistent with the present disclosure, the offset between the current actual center of gravity position of the UAV and the standard position can be obtained, such that the degradation of the flight quality caused by the offset of the center of gravity position can be eliminated based on the offset. The technical solutions of the present disclosure is simple and convenient for users, has strong operability, and can greatly improve the payload adaptation capability of the UAV. Users can adapt their own payloads to the UAV frame without worrying about the deterioration of the flight quality, which significantly improves the ability of the AUV to support third-party payloads.

Figure 8:
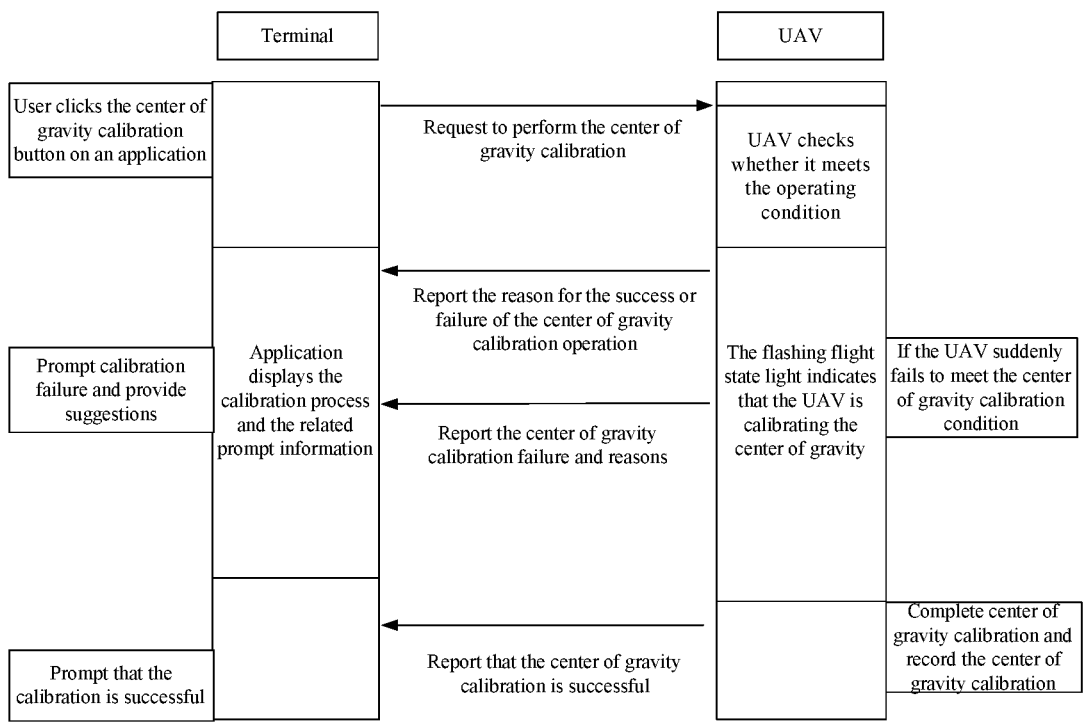
FIG. 8 is a schematic diagram of interactive realization of a center of gravity calibration operation according to an embodiment of the present disclosure.

FIG. 8 is a schematic diagram of interactive realization of a center of gravity calibration operation according to an embodiment of the present disclosure. The interactive realization of a center of gravity calibration operation will be described in detail below.

(1) The user operates the UAV to complete the take-off operation and causes the UAV to enter the positioning hovering mode. At the same time, the UAV may be at least two meters above the ground to reduce the turbulence caused by the ground.

(2) After the UAV receives the trigger instruction, the UAV may check whether the current state of the environment can perform the center of gravity calibration. For example, if the UAV detects that the attitude output is not zero when hovering, the UAV may report to the terminal application that the center of gravity calibration currently cannot be performed, and remind the user to perform IMU calibration and move to a windless environment to stat the calibration process again. Alternatively, if all detections are passed, the UAV may automatically perform the center of gravity calibration process.

(3) The UAV ma record the various control variables output by the controller to eliminate the center of gravity offset within a period of time. After counting of the data within the period of time, random errors can be eliminated by averaging and other methods, and then the above algorithm can be used to calculate the estimated value of the center of gravity offset. In order to inform the user of the calibration progress in real time, the calibration state can be reported to the user by flashing the UAV state light with a special color light or displaying the progress bar on the terminal application in real time.

(4) If the user performs an operation during the calibration process or the data convergence is poor due to the limited accuracy of the sensor, the calibration operation may be interrupted in advance, and the calibration failure and the reason for the failure can be reported to the user through terminal application.

(5) After the flight control system calculates the estimated value of convergence, the flight control system can notify the user of the successful calibration through the terminal application, and record the value in the non-volatile memory for subsequent flight when carrying the same payload.

(6) At this point, the entire center of gravity calibration process is completed.

In some embodiments, after the algorithm estimates the center of gravity offset value, the offset value can be compared with an offset range supported by the UAV during the center of gravity calibration process to inform the user whether the installation position exceeds the specified range. In this way, the UAV may self-detect whether it supports the payload.

The interactive terminal for the center of gravity calibration can be a terminal such as a terminal application, a remote control, and a host computer, which are not limited in the embodiments of the present disclosure.

In other embodiments, if the positioning accuracy of the UAV is very high, the center of gravity calibration of the UAV may also be carried out in in-door or non-open scenes.

The embodiments of the present disclosure are applicable to UAV with real-time changes in payload. For example, when the payload changes in real-time, such as oil-powered UAVs and plant protection UAVs. The flight controller of the UAV can calibrate the center of gravity in real time to adapt to the real-time changing payload, ensuring the stability and safety of the light, and improving the user experience. Further, when the UAV is hovering, the current center of gravity offset level can be updated and calculated, and the user can be alerted in dangerous situations.

An embodiment of the present disclosure provides a computer storage medium. The computer storage medium can be configured to store program instructions. A processor can be configured to execute the program instructions stored in the computer storage medium. When executed by the processor, the program instructions can cause the processor to obtain the target flight data and the current flight data, determine the control state variable based on the target flight data and the current flight data, and perform the center of gravity calibration of the UAV based on the control state variable.

In some embodiments, the control state variable may include four or more control state variables, including a total pulling force instruction, a yaw axis torque instruction, a pitch axis torque instruction, and a roll axis torque instruction. More specifically, the target flight data and the current flight data of the UAV can be obtained. During the flight control of the UAV, four of more control state variables can be provided based on the target flight data and the current flight data, namely the total pulling force instruction, yaw axis torque instruction, pitch axis torque instruction, and roll axis torque instruction. Further, the UAV may include a power device, and the power device may be one or more motors. The four control state variables mentioned above may correspond to the forces and torques received by the UAV due to the respective motors, that is, the total pulling force, yaw axis torque, pitch axis torque, and roll axis torque. The center of gravity of the UAV can be calibrated based on the control state variable. Further, the offset between the center of gravity of the UAV and the center of pull of the UAV can be obtained based on the control state variable.

In some embodiments, the computer storage medium may be a volatile memory or a non-volatile memory. The computer storage medium may also be a serial memory or a parallel memory. The computer storage medium may be a random-access memory (RAM) or a read-only memory (ROM).

In some embodiments, the program instruction causing the processor to calibrate the center of gravity of the UAV based on the control state variable may include calculating the offset data between the center of gravity of the UAV and the center of pull of the UAV based on the control state variable.

In some embodiments, the offset data may include one or a combination of an offset position, an offset mass, an offset force, and an offset torque.

In some embodiments, the offset data between the control state variable of the UAV and the center of pull of the UAV can be calculated based on the control state variable, that is, the offset between the actual position of the center of gravity of the UAV and the standard position. The offset data may be the offset position, offset mass, offset force, offset torque, etc.

In some embodiments, the flight controller of the UAV may continuously provide four or more control state variables during the flight of the UAV. The four or more control state variables may include, e.g., the total pulling force instruction $T_c$, the yaw axis torque instruction $\tau_{zc}$, the pitch axis torque instruction $\tau_{yc}$, and the roll axis torque instruction $\tau_{xc}$. These four control state variables may correspond to the forces and torques that the UAV will eventually receive due to the speed of each motor, that is, the total pulling force T, the yaw axis torque $\tau_z$, the pitch axis torque $\tau_y$, and the roll axis torque $\tau_x$.

The center of a circumscribed circle of a regular polygon surrounded by all the motor positions can be defined as an equivalent pull center. As shown in FIG. 2, take a quad-rotor UAV as an example, the quad-rotor UAV includes four motors, and a point O is the equivalent pull center of the quad-rotor UAV. Based on the force translation theorem, the pulling force of all motors can be equivalent to the total pulling force T on the center of the equivalent pulling force plus two torques $\tau_x$ and $\tau_y$ around the horizontal axis.

When the center of gravity of the UAV is completely coincident with the center of gravity of the pulling force, based on the two-force balance rule, the pulling force may only need to equal to the gravity, that is T=G, to maintain the balance of the UAV. At this time, the torque on the two horizontal rotation axes of the UAV may be close to zero. However, if the center of gravity of the UAV does not coincide with the equivalent pulling center, the user may also need to manually adjust the AUV torque to maintain balance. Take the non-coincidence in the roll direction as an example, the force analysis diagram can be as shown in FIG. 3. Based on the law of force balance of rigid bodies, when the AUV maintains a stable hovering state, then $$T=G \tag{1}$$

$$T \times d_y + \tau_x = 0 \tag{2}$$

When the UAV has reached a stable state, then $$T=T_c \tag{3}$$

$$\tau_x = \tau_{xc} \tag{4}$$

Therefore, $d_y = -\tau_{xc}/T_c$, and $d_x = -\tau_{yc}/T_c$. In this way, when the UAV remains hovering, the flight control system of the UAV can use the above formulas to calculate the horizontal position of the UAV's center of gravity relative to the center of the propeller plane under current mounting, that is, the offset distance.

Of course, the offset data is not limited to the offset distance. In other embodiments, the offset data may include one or a combination of the offset position, the offset mass, the offset force, and the offset torque. For example, for some UAVs whose modeling is not accurate enough, the estimated center of gravity offset may not be the true offset distance, but a controlled compensation value from the vertical channel to each rotation channel, such as the offset mass, the offset force, the offset torque, etc. This embodiment is merely an example, and should not be construed as a limitation in the embodiments of the present disclosure.

In some embodiments, the program instructions can also be used to store offset data.

In some embodiments, after calibrating the offset data, the offset data may be stored to a non-volatile memory such as Flash, EEPROM, etc. Under to condition of carrying the same payload, the UAV may load the offset data every time after powering on. The UAV may provide early compensation control based on the offset data every time it takes off, such that the equivalent pulling center may also act on the actual center of gravity. In this way, the early compensation can eliminate the "take-off nodding" situation described above.

In some embodiments, the program instruction may further cause the processor to obtain the control component based on the offset data, and control the power unit of the UAV based on the control component.

In some embodiments, the control component can be generated based on the offset data, and the power device of the UAV can be controlled based on the control component to reduce the offset data, thereby making the UAV fly stably, and improving the flight quality. The flight control system may distribute the control amount of each control channel more accurately and reduce the coupling amount between the channels. For example, at each take-off, the UAV's control system may accurately distribute the pulling force of each power device through the early compensation control based on the stored offset data, such that the equivalent pulling force center may also act on the actual center of gravity. In this way, the early compensation can eliminate the "take-off nodding" situation described above. Alternatively, during the flight of the UAV, the pulling force of each power device may be accurately distributed, such that the equivalent pulling force center may also act on the actual center of gravity, thereby ensuring flight quality.

In some embodiments, the program instruction may further cause the processor to compare the offset data with the preset threshold, and determine whether the payload installation position of the UAV exceeds the specified installation range based on the comparison result.

In some embodiments, the program instructions causing the processor to determine whether the payload installation position of the UAV exceeds the specified installation range based on the comparison result may include determining that the payload installation position of the UAV exceeds the specified installation range when the comparison result indicates that the offset data is greater than or equal to the preset threshold; and determining that the payload installation position of the UAV does not exceed the specified installation range when the comparison result indicates that the offset data is less than the preset threshold. It can be understood that in other embodiments, whether the payload installation position of the UAV exceeds the specified installation range based on the comparison result may also be determined based on other suitable preset rules. For example, the UAV's payload installation position may be determined as exceeding specified installation range when the comparison result indicates that the offset data is greater than the preset threshold; and the UAV's payload installation position may be determined as not exceeding specified installation range when the comparison result indicates that the offset data is less than or equal to the preset threshold, which is not limited in the embodiments of the present disclosure.

In some embodiments, after calculating the offset data, the offset data may be compared with the preset threshold (i.e., the offset range) supported by the UAV to inform the use whether the payload installation position exceeds the preset threshold. In this way, the UAV may self-detect whether it supports the payload installation or whether the payload installation position is reasonable.

In some embodiments, the program instruction may further cause the processor to record the control state variable in a preset period of time, and perform the center of gravity calibration of the UAV based on the control state variable in the preset period of time.

In some embodiments, the output of each control state variable may be recorded to eliminate the offset of the center of gravity over a period of time. After counting the control state variable within a period of time, the random error of the control state variable can be eliminated by taking the average value and other methods to eliminate the interference caused by wind or aircraft vibration. Subsequently, the offset data can be calculated to improve the accuracy of the offset data.

In some embodiments, the program instruction may further cause the processor to obtain the state data of the UAV and determine whether the state data meets the condition of calibrating the center of gravity before calibrating the center of gravity of the UAV based on the control state variable. When the state data meets the condition of calibrating the center of gravity, the calibration of the center of gravity of the UAV can be performed based on the control state variable.

In some embodiments, the state data may include one or a combination of positioning data, image data, attitude data, acceleration data, and angular velocity data.

In some embodiments, the condition of calibrating the center of gravity may include the UAV being in a balanced state.

In some embodiments, the condition of calibrating the center of gravity may further include the inertial measurement unit (IMU) of the UAV being calibrated with data.

In some embodiments, before calibrating the center of gravity of the UAV, it may be needed to determine whether the state data meets the condition for allowing the center of gravity calibration. For example, the condition of calibrating the center of gravity may be whether the UAV is in a balanced state, and the center of gravity calibration may be accurate when the UAV is in the balanced state. In some embodiments, the balanced state may include the hovering mode and the mode where the horizontal position is stationary during the course of heading rotation in the positioning mode. The condition of calibrating the center of gravity may also be that the IMU of the UAV has calibrated the data. When the UAV is in a balanced state and the data obtained by the IMU is accurate data, the accuracy of the center of gravity calibration can be improved.

In some embodiments, the program instruction may further cause the processor to obtain the surrounding environment data of the UAV, and determine whether the surrounding environment data meets the condition of calibrating the center of gravity. When the surrounding environment data meets the condition of calibrating the center of gravity, the center of gravity of the UAV can be calibrated based on the control state variable.

In some embodiments, the surrounding environment data may include the ambient airflow or the ambient wind speed.

In some embodiments, the condition of calibrating the center of gravity may include the wind speed of the environment in which the UAV is positioned being less than a preset wind speed.

In some embodiments, the surrounding environment data can be obtained based on the attitude of the UAV, or based on other external sensors, such as anemometers of information obtained from cloud weather stations. When the surrounding environment is a windless environment, no external force will be brought to the UAV to interfere with the airflow. In this way, the interference in the calibration of the center of gravity of the UAV can be avoided.

In some embodiments, the condition of calibrating the center of gravity may include the following conditions.

(1) The UAV has positioning and hovering capabilities. In the above calculations, it is assumed that the UAV is already in the balanced state, that is, the above derivation process may only be established when the UAV is at a stationary state. Since it is very difficult to rely on users to maintain the balance an UAV with multiple wings, the UAV may need to have the ability to position and hover without manual operation. Further, whether the UAV is in the balanced state may be determined through positioning data, image data, attitude data, etc. For example, the positioning information of the UAV can be obtained through positioning devices (such as GPS, real-time kinematic (RTK) technology, etc.). When the obtained position of the UAV has not changed, the UAV can be considered to be in a hovering state. Alternatively, a plurality of images of the surrounding environment of the UAV can be obtained through a visual sensor within a certain period of time, and image processing can be performed on the obtained plurality of images. When the position of the object in the obtained images has not change, the UAV can be considered to be in a hovering state. Further, the acceleration and speed information of the UAV can also be obtained through the IMU. When the acceleration and speed of the UAV are zero, the UAV can be considered to be in a hovering state. In other embodiments, the determination can also be made by data fusion of one or more of the above determination methods to improve the determination accuracy.

(2) The surrounding airflow is stable and there is no wind. When the surrounding environment is windy, the UAV may also be affected by external forces caused by the interference of the airflow. As such, even if the UAV is in a hovering state, due to the introduction of new external forces that are difficult to estimate and cannot be ignored, the above derivation process will be invalid. Therefore, the environment required for calibration may need to be a calm airflow environment with no wind. Whether the UAV is in a windless environment can be determined based on the inclination angle data of the UAV, etc. In some embodiments, the inclination angle data of the UAV can be obtained by a wind collecting device.

(3) The IMU of the UAV is calibrated correctly. The IMU needs to have been calibrated to eliminate the steady-state error caused by temperature, otherwise the error will be considered by the above algorithm to be caused by the center of gravity offset. UAVs can have the IMU calibration function, and it is recommended to recalibrate the IMU before each calibration of the center of gravity.

In some embodiments, the distance of the UAV from the ground may be greater than a preset distance. In this case, the UAV can be ensured to be at a preset distance from the ground, for example, at a height of more than two meters from the ground, thereby reducing the influence of turbulence caused by the ground.

In some embodiments, the program instruction may further cause the processor to stop the calibration when the condition of calibrating the center of gravity is not met, and send a first instruction to the control terminal. In this case, the first instruction may include the reason for not meeting the condition of calibrating the center of gravity and adjustment suggestion information.

In some embodiments, the program instruction may further cause the processor to stop the calibration when the calibration fails, and send a second instruction to the control terminal. In this case, the second instruction may include the reason for the calibration failure.

Consistent with the present disclosure, the offset between the current actual center of gravity position of the UAV and the standard position can be obtained, such that the degradation of the flight quality caused by the offset of the center of gravity position can be eliminated based on the offset. The technical solutions of the present disclosure is simple and convenient for users, has strong operability, and can greatly improve the payload adaptation capability of the UAV. Users can adapt their own payloads to the UAV frame without worrying about the deterioration of the flight quality, which significantly improves the ability of the AUV to support third-party payloads.

In the present disclosure, terms of "first" and "second" are only used for description and cannot be seen as indicating or implying relative importance or indicating or implying the number of the indicated technical features. Thus, the features defined with "first" and "second" may comprise or imply at least one of these features. In the description of the present disclosure, "a plurality of" means two or more than two, unless specified otherwise.

Further, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements or interactions of two elements, which can be understood by those skilled in the art according to specific situations.

In the present disclosure, descriptions of reference terms such as "an embodiment," "some embodiments," "illustrative embodiment," "example," "specific example," or "some examples," mean that characteristics, structures, materials, or features described in relation to the embodiment or example are included in at least one embodiment or example of the present disclosure. In the present description, illustrative expression of the above terms does not necessarily mean the same embodiment or example. Further, specific characteristics, structures, materials, or features may be combined in one or multiple embodiments or examples in a suitable manner.

Although the embodiments of the present disclosure have been shown and described above, it can be understood that the above embodiments are exemplary and should not be construed as limitations on the present disclosure. Those skilled in the art can change, modify, substitute, or vary the above embodiments within the scope of the present disclosure. The scope of the present disclosure is defined by the appended claims and their equivalents.

What is claimed is:

1. An aerial vehicle control method comprising:
    determining a control state variable;
    determining whether the aerial vehicle meets a condition of calibrating a center of gravity, including determining whether surrounding environment data of the aerial vehicle meets the condition of calibrating the center of gravity, the surrounding environment data including an ambient airflow or an ambient wind speed; and
    in response to the aerial vehicle meeting the condition of calibrating the center of gravity, calibrating the center of gravity of the aerial vehicle based on the control state variable.

2. The method of claim 1, wherein calibrating the center of gravity of the aerial vehicle based on the control state variable includes:
    calculating offset data between the center of gravity of the aerial vehicle and a center of pull of the aerial vehicle based on the control state variable.

3. The method of claim 2, further comprising:
    storing the offset data.

4. The method of claim 2, further comprising:
    generating a control component based on the offset data, and controlling a power unit of the aerial vehicle based on the control component.

5. The method of claim 2, further comprising:
    comparing the offset data with a preset threshold, and determining whether a payload installation position of the aerial vehicle exceeds a specified installation range based on a comparison result.

6. The method of claim 5, wherein determining whether the payload installation position of the aerial vehicle exceeds the specified installation range based on the comparison result includes:
    determining that the payload installation position of the aerial vehicle exceeds the specified installation range if the comparison result indicates the offset data is greater than or equal to the preset threshold; and
    determining that the payload installation position of the aerial vehicle does not exceed the specified installation range if the comparison result indicates the offset data is less than the preset threshold.

7. The method of claim 1, further comprising:
    recording the control state variable in a preset period of time, and performing the calibrating of the center of gravity of the aerial vehicle based on the control state variable in the preset period of time.

8. The method of claim 1, further comprising:
obtaining state data of the aerial vehicle, the state data including one or a combination of positioning data, image data, attitude data, acceleration data, and angular velocity data;
wherein determining whether the aerial vehicle meets the condition of calibrating the center of gravity further includes determining whether the state data meets the condition of calibrating the center of gravity.

9. The method of claim 1, wherein:
the condition of calibrating the center of gravity further includes the aerial vehicle being in a balanced state.

10. The method of claim 9, wherein:
the condition of calibrating the center of gravity further includes an inertial measurement unit (IMU) of the aerial vehicle being calibrated with data.

11. The method of claim 1, wherein:
the surrounding environment data meeting the condition of calibrating the center of gravity includes a wind speed of an environment in which the aerial vehicle is located being less than a preset wind speed.

12. The method of claim 9, wherein:
a distance of the aerial vehicle from a ground is greater than a preset distance.

13. The method of claim 1, further comprising:
stopping the calibration of the center of gravity of the aerial vehicle and sending a first instruction to a control terminal when the condition of calibrating the center of gravity is not met.

14. The method of claim 1, further comprising:
stopping the calibration of the center of gravity of the aerial vehicle and sending a second instruction to the control terminal when the calibration fails.

15. The method of claim 2, wherein:
the offset data includes one or a combination of an offset position, an offset mass, an offset force, and an offset torque.

16. The method of claim 1, further comprising:
obtaining flight data;
wherein determining the control state variable includes:
determining the control state variable based on the flight data.

17. The method of claim 1, wherein the control state variable includes at least one of a total pulling force instruction, a yaw axis torque instruction, a pitch axis torque instruction, or a roll axis torque instruction.

18. An aerial vehicle control device, comprising:
a processor configured to:
determine a control state variable;
determine whether the aerial vehicle meets a condition of calibrating a center of gravity, including determining whether surrounding environment data of the aerial vehicle meets the condition of calibrating the center of gravity, the surrounding environment data including an ambient airflow or an ambient wind speed; and
in response to the aerial vehicle meeting the condition of calibrating the center of gravity, calibrate the center of gravity of the aerial vehicle based on the control state variable.

19. An aerial vehicle, comprising:
a power device; and
a controller configured to:
determine a control state variable;
determine whether the aerial vehicle meets a condition of calibrating a center of gravity, including determining whether surrounding environment data of the aerial vehicle meets the condition of calibrating the center of gravity, the surrounding environment data including an ambient airflow or an ambient wind speed; and
in response to the aerial vehicle meeting the condition of calibrating the center of gravity, calibrate the center of gravity of the aerial vehicle based on the control state variable.

* * * * *